United States Patent [19]
Greul et al.

[11] Patent Number: 5,649,277
[45] Date of Patent: Jul. 15, 1997

[54] PROCESS AND APPARATUS FOR THE FREE-FORMING MANUFACTURE OF THREE DIMENSIONAL COMPONENTS OF PREDETERMINED SHAPE

[75] Inventors: Mathias Greul, Bremen; Ewald Staskewitsch, Osterholz-Schambeck; Wilhelm Steger, Stuttgart; Theo Pintat, Ritterhude; Martin Geiger, Stuttgart; Klaus Melchior, Besigheim, all of Germany

[73] Assignee: Fraunhofer-Gesellschaft Zur Foerderung Der Angewandten Forschung E.V., Muenchen, Germany

[21] Appl. No.: 258,670

[22] Filed: Jun. 13, 1994

[30] Foreign Application Priority Data

Jun. 9, 1993 [DE] Germany ............... 43 19 128.2

[51] Int. Cl.⁶ ............... B22F 1/00; B22F 3/10; B22F 7/02
[52] U.S. Cl. ............... 419/2; 419/7; 419/36; 419/37; 75/228; 75/255; 29/527.1; 29/DIG. 24; 29/DIG. 47; 266/200; 266/236
[58] Field of Search ............... 419/2, 7, 36, 37; 75/228, 255; 29/DIG. 47, 527.1, DIG. 5, DIG. 4; 266/200, 236

[56] References Cited

U.S. PATENT DOCUMENTS

| | | | |
|---|---|---|---|
| 4,721,599 | 1/1988 | Nakamura | 419/23 |
| 5,074,532 | 12/1991 | Ducrocq et al. | 266/237 |
| 5,122,632 | 6/1992 | Kinkelin | 219/121.63 |
| 5,433,280 | 7/1995 | Smith | 175/336 |
| 5,529,471 | 6/1996 | Khoshevis | 425/112 |

FOREIGN PATENT DOCUMENTS

| | | |
|---|---|---|
| 0426363A2 | 10/1990 | European Pat. Off. |
| 3938894C2 | 11/1993 | Germany. |

*Primary Examiner*—Charles T. Jordan
*Assistant Examiner*—Daniel Jenkins
*Attorney, Agent, or Firm*—Morrison Law Firm

[57] ABSTRACT

An apparatus and process for the free-forming manufacture of three-dimensional components. A powder-binder mixture, or a material with a high melting point, is plasticized or made molten, by raising the temperature inside a process chamber. The resulting molten material is discharged under pressure through a nozzle which is arranged at the end of the process chamber. The material inside the process chamber is deposited in layers. The processing direction and processing speed of the nozzle are programmed. An embodiment of the invention is disclosed in which a non-molten powder is deposited and supported by the deposition of a second powder alongside the non-molten powder.

23 Claims, 3 Drawing Sheets

PROCESS AND APPARATUS FOR THE FREE-FORMING MANUFACTURE OF THREE DIMENSIONAL COMPONENTS OF PREDETERMINED SHAPE

BACKGROUND OF THE INVENTION

The present invention relates to an apparatus and a process for the free-forming manufacture of three-dimensional components having a predetermined shape. More particularly, the present invention relates to an apparatus and process for the free-forming manufacture of three-dimensional components, using layered discharge of a material onto a base through a programmed nozzle.

The problem of visualizing and describing solid shapes in three dimensions crosses many fields of the sciences and can create serious obstacles in the design process. Engineers of all types, and anyone faced with the necessity of visualizing conceived surfaces and associated spaces, for the purpose of communicating them to others, is benefitted by creation of three dimensional models. There exists an ongoing need to enhance the speed and accuracy of systems which aid in representing three dimensional models to those involved in the innovation cycle.

Three dimensional components have traditionally been difficult to manufacture without the use of molds. This problem has been addressed at length in the prior art. Traditionally, three dimensional forms have been described by a series of drawings made up of two dimensional projections of a body on a set of orthogonal planes passing through it. These types of representations of shapes of a complex nature are often insufficient. The hidden features are not properly illustrated, and if they are, two dimensional drawings quickly become too cluttered to read and understand.

Computer Aided Design and Manufacturing have facilitated improvements within the context of visualizing geometrically complicated shapes. However, the problem of free-forming three dimensional models has not been adequately addressed in terms of industrial efficiency to date. The prior art discloses no devices which permit the facile translation of computer designed and generated shapes to three dimensional models using a broad range of materials.

Although conventional machines exist to generate three dimensional models, their utility has been limited by the number of steps and therefore time, required to go from the initial design to final model production. Use of extruders for this purpose has additionally been constrained by an inability to control their processing direction and speed adequately.

European patent No. EP 0426 363 A2 discloses a process tailored to the individual needs of each component to be manufactured. EP 0426 363 A2 thus requires preparation time and increased costs for each application. It is first necessary to map out locations needed to apply the liquefied material to be discharged. Then generation of control data is required for these locally defined and proportioned material discharges. Finally, the material is discharged through a nozzle system.

According to EP 0426 363 A2, liquefied material is discharged in pre-determined places by a controllable nozzle head. The component is thus produced by free-forming during a series of time consuming and discrete steps. The discharge of different materials requires a nozzle which is adapted to the respectively required material properties. At least one computer is used for data processing, process control and visual display. As shown by this conventional arrangement, a thermoplastic raw material is discharged through the nozzle. Modelling takes place in layers. A bar-shaped or wire-shaped material is then fed into a process chamber. Through temperature variation, the material becomes molten. This step occurs directly prior to entry into the nozzle located at the terminal sector of the process chamber. The molten material is then discharged through the nozzle under pressure. The pressure is provided by pushing the bar-shaped or wire-shaped material through the process chamber.

Longstanding difficulties with this process include the limitation that it is often difficult to terminate the discharge process. This is because the discharge cannot be stopped immediately when the material is prepared for removal from the process chamber assembly. Likewise, the described arrangement only works for materials with a low melting point, such as plastics or waxes. Materials with high melting points do not work effectively. This is because it is impossible to reach sufficiently high temperatures within the short section of the process chamber.

Furthermore, in the known arrangement, the material in the nozzle can never be fully discharged. This is because no pressure can be applied after the bar-shaped material is used up. Thus the remaining material stays in the nozzle and in the space immediately prior to the nozzle. The only way to discharge the remaining material is by feeding in a new piece of the bar-shaped material.

An additional shortcoming of the prior art is the difficulty in manufacturing components consisting of different materials. Due to the limitations discussed above, this can only be accomplished by using several separate nozzles.

OBJECTS AND SUMMARY OF THE INVENTION

Accordingly, it is an object of the present invention to provide an apparatus and a process which overcome the drawbacks of the prior art.

It is a further object of the present invention to provide an apparatus and a process that permits facile translation of computer designed shapes to three dimensional models A still further object of the invention to provide an apparatus and a process which facilitate the manufacture of components made from materials with high melting points. Another object is to provide a system which is adapted to free-form three dimensional models from a plurality of different starting materials. Still another object is to provide a system wherein the mechanical working parts are particularly well adapted to computer controls.

Briefly stated, an apparatus and process for the free-forming manufacture of three-dimensional components is provided. A powder-binder mixture, or a material with a high melting point, is plasticized or made molten, by raising the temperature inside a process chamber. The resulting material is discharged under pressure through a nozzle which is arranged at the end of the process chamber. The material inside the process chamber is deposited in layers. The processing direction and processing speed of the nozzle are programmed.

According to an embodiment of the invention, there is provided an apparatus for the free-forming manufacture of three-dimensional components of a predetermined shape, which comprises, a process chamber having first and second ends, a nozzle, arranged at a first end of the process chamber, through which a plasticized or molten material is discharged, means for generating a temperature inside the process chamber at which a starting material is plasticized or made molten, means for producing a pressure sufficient to discharge the plasticized or molten material through the nozzle, means for programming the nozzle to discharge the plasticized or molten material for deposit, and means for receiving the plasticized or molten material.

According to a feature of the invention, there is provided an apparatus for the free-forming manufacture of three-dimensional components of a predetermined shape, which comprises, a process chamber having first and second ends, a nozzle, arranged at a first end of the process chamber, through which a plasticized or molten material is discharged, means for generating a temperature inside the process chamber at which a starting material is plasticized or made molten, means for producing a pressure sufficient to discharge the plasticized or molten material through said nozzle, means for programming said nozzle to discharge said plasticized or molten material for deposit, and means for receiving said plasticized or molten material, wherein said means for producing pressure is gas fed into said process chamber.

According to a further embodiment of the invention, there is provided a process for the free-forming manufacture of three-dimensional components, by means of the layered discharge of a material through a programmed nozzle onto a base, comprising, producing a powder-binder mixture from a powder material with a high melting point and a binder, filling said mixture into a process chamber, plasticizing the mixture in the process chamber by raising the temperature until the powder-binder mixture has become plasticized, applying pressure to the plasticized material, depositing said plasticized material in layers through a nozzle arranged at one end of the process chamber, whereby the material is discharged by means of pressure building up in the process chamber and completing the discharge process by reducing pressure in the process chamber, whereby the processing direction and processing speed of the nozzle is programmed during the entire process.

The above, and other objects, features and advantages of the present invention will become apparent from the following description read in conjunction with the accompanying drawing.

DETAILED DESCRIPTION OF THE PREFERRED EMBODIMENTS

Figure 1:
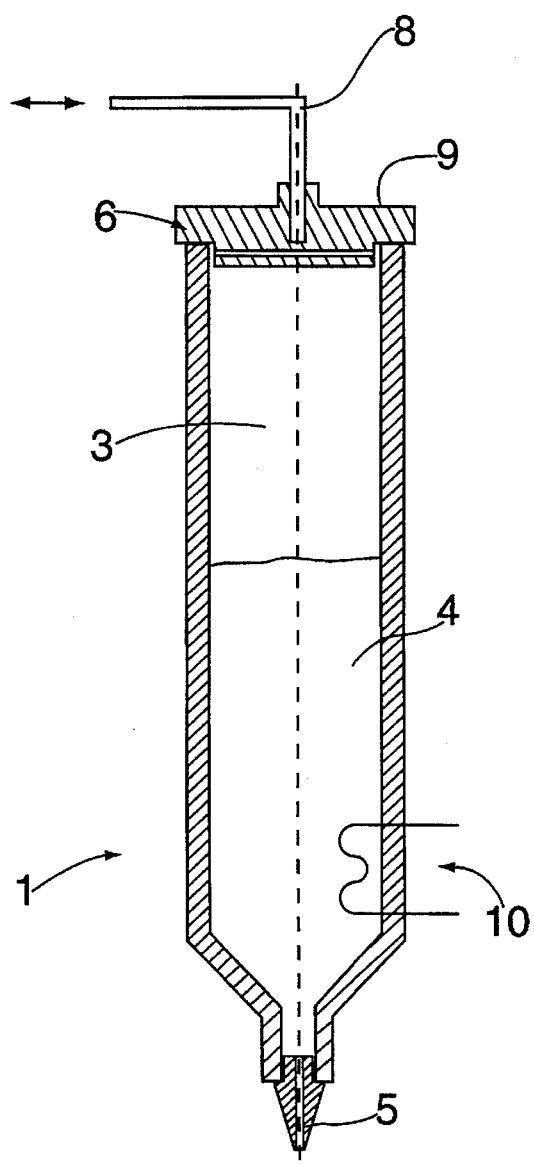
FIG. 1 is a cross section of a process chamber with pressure produced by a gas supplied according to an embodiment of the present invention.

Referring now to FIG. 1, a process chamber 1, includes a cylinder-shaped pressure chamber 3, in which a material 4 to be deposited may be placed. The material 4, is in powder form at the beginning of the process.

The cylinder-shaped pressure chamber 3 is closed at one end by an exchangeable nozzle 5. The cylinder-shaped pressure chamber 3 is closed at its other end by a pressure-generating device 6. Pressure is produced in the process chamber 1 by introducing a pressurized gas from a gas line 8 through a cover having a valve system 9.

The portion of the material 4 near the exchangeable nozzle 5 is melted by a heater unit 10 located nearby the exchangeable nozzle 5. The material in this region thus becomes molten or plasticized.

The introduction of gas into the cylinder-shaped pressure chamber 3 forces the molten material 4 downward for discharge through exchangeable nozzle 5. If the gas supply is interrupted, or if a vacuum is generated, the discharge process is interrupted.

The flow of gas, and movement of process chamber 1 are controlled by a control system to permit the building up of a three-dimensional object, layer by layer, on a base (not shown) for prototyping, visualization or other purpose. In one embodiment of the invention, after each layer is deposited it is hardened by, for example, exposing the layer to, for example, a cooling liquid or gas, radiation, a curing catalyst, or any other material or process (not shown) for hardening the material 4.

Figure 2:
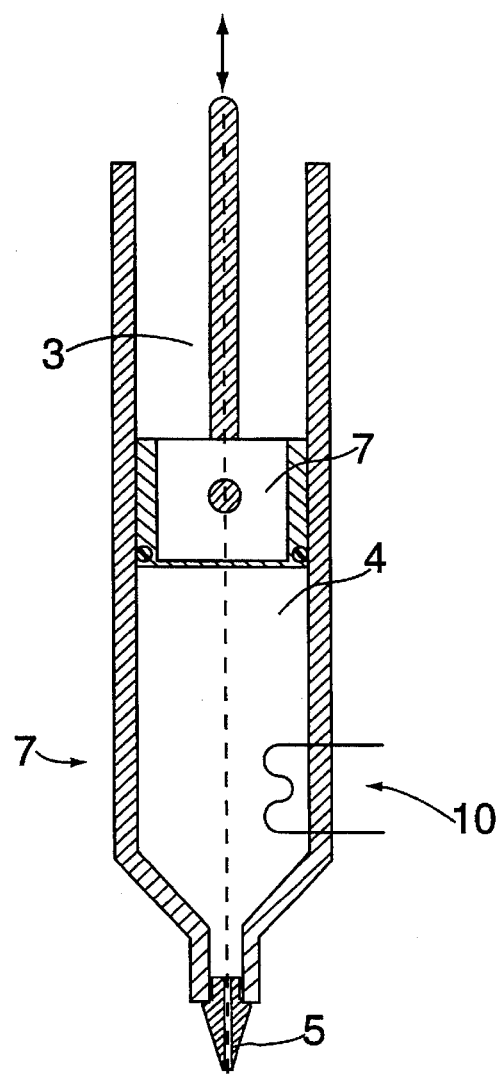
FIG. 2 is a cross section of a process chamber with pressure produced by a piston according to an embodiment of the present invention.

Referring now to FIG. 2, an alternate means for generating and regulating pressure is illustrated. Pressure is generated by a piston 7, which can be moved up and down inside the cylindrical container 3. Pressure is reduced by interrupting the gas pressure in FIG. 1 or by moving piston 7 upward in FIG. 2.

To ensure the most effective use of the apparatus of the present invention for the free-forming manufacture of components, it is preferred that starting materials are materials with high melting points (such as copper).

The resulting three-dimensional object, created from the representation of the object in computer memory, if made of a suitable material permits the running of material function tests. The process according to the present invention teaches that homogeneous materials with high melting points, in powder form, are preferred. Also preferred are materials in powder-binder mixture form (e.g. 50% copper powder and 50% binder such as wax or polymer).

A powder-binder mixture of a type in which no phase transition takes place from the solid phase to the molten phase, is particularly suitable for many application. This applies to materials with high melting points (mostly metallic). However, when the material has been destructured to discharge it from the nozzle, at the melting temperatures of the binder, then the material is plasticized into a doughy consistency. The viscosity of the material thus varies with the temperature.

The melting temperatures of binder materials are in the range of from about 100° to about 150° C. To implement the process according to the present invention, the powder mixture inside the process chamber 1, near exchangeable nozzle 5 is first plasticized by heating unit 10. Next, the molten material is discharged, by the gas-produced, or piston-produced pressure, through the nozzle in the lower part of the process chamber. Pressure is adjustable independently of other process parameters.

Subsequently, the component built up from discharged layers may be further heat treated, or subjected to other processes. In the case of a powder-binder mixture, after the object is built up, heat treatment may be used to remove the binder and sinter the copper to form an all-copper object.

Figure 3:
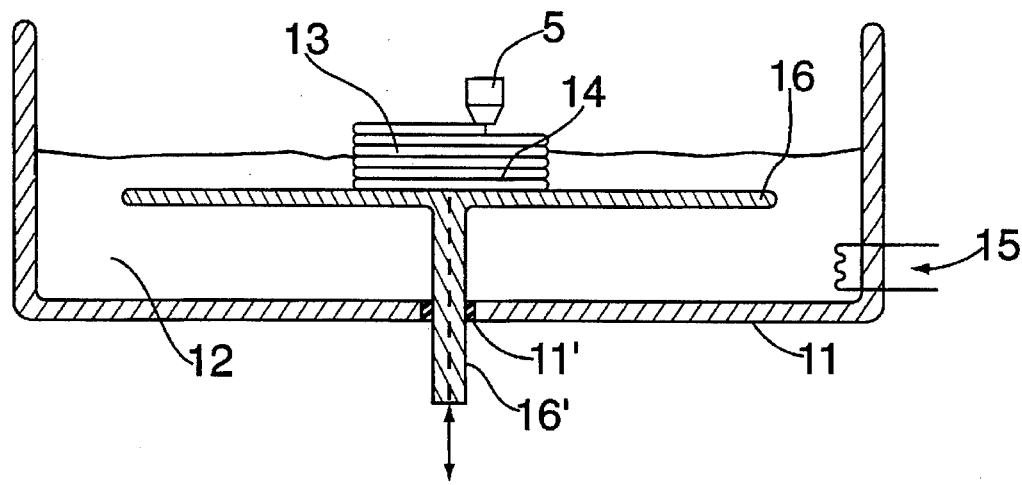
FIG. 3 is a cross section of a depositing base with temperature regulation according to an embodiment of the present invention.

Referring now to FIG. 3, a container 11 contains a height-adjustable elevating table 16, whose height can be adjusted by raising or lowering a stem 16' which passes through a central opening in container 11. A seal 11' seals about stem 16', thereby preventing leakage of a liquid 12 from container 11. Table 16 begins at its highest position adjacent exchangeable nozzle 5. Exchangeable nozzle 5 discharges molten material while exchangeable nozzle 5 is moved in a path to form a lowest layer of a discharged part. Then, table 16 is moved downward one increment. Then exchangeable nozzle 5 discharges molten material to form a new layer upon the already discharged part while exchangeable nozzle 5 is moved in a path suitable for forming the new layer.

A liquid 12 may be introduced to a desired level in container 11. The level is preferably just below the level of the already discharged part 14 so that, when table 16 is lowered its next increment, the just-discharged layer is partly submerged, and thereby heated or cooled to solidify it. The temperature of the liquid 12 determines the temperature of the already discharged portion 14, of the component 13 being formed. A temperature regulator 15 is disposed in container 11 for controlling the temperature of liquid 12. Temperature regulator 15 may be, for example, a heating coil or a cooling coil, depending on the regulation required to solidify the material being discharged.

Figure 4:
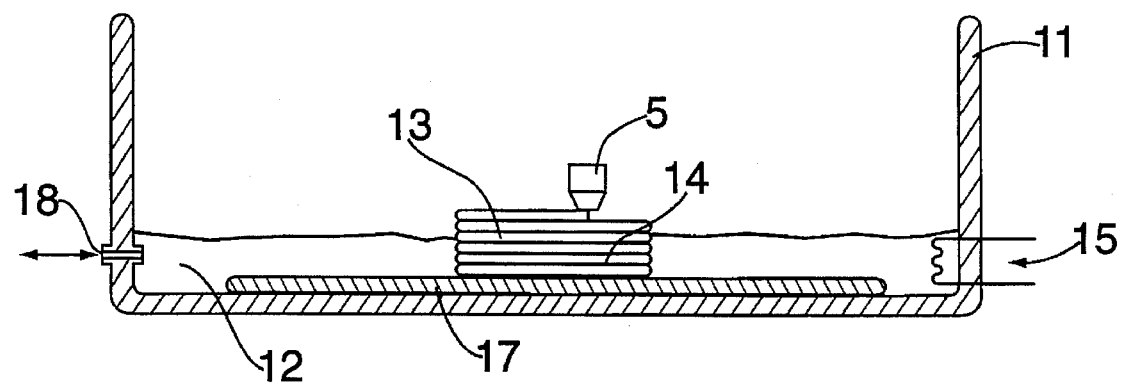
FIG. 4 is a cross section of a depositing base with temperature regulation according to another embodiment of the present invention.

Referring now to FIG. 4, the component 13, is deposited on a solid, non-movable base 17. The exchangeable nozzle 5, besides being controlled in translation during deposition of a layer, is also incremented upward after the deposition of a layer to permit deposition of the next layer. The level of the liquid 12 is adjusted to the height of the deposited portion 14, of component 13, by adding liquid to container 11 after completion of each layer. Additional liquid 12 is added through an inflow and outflow arrangement 18 which passes through container 11. After the desired three-dimensional component 13 is formed, liquid 12 is drained from container 11 through inflow and outflow arrangement 18 to permit retrieval of component 13, and to prepare for the next operating cycle.

It would be apparent to one skilled in the art that component 13 will shrink during sintering. However, the shrinkage properties of materials during sintering are well known, and are therefore compensated beforehand by the control program by suitably oversizing component 13 so that, upon completion of sintering, a properly sized component 13 is produced. Likewise, the effect of distortion of the component 13 during sintering is well known to those skilled in the art. Such distortion is also pre-compensated by the control program so that the sintered component 13 arrives at the desired final shape.

The processing direction, and the processing speed of the nozzle are programmed and controlled during the entire discharge process. The materials with a high melting point can be either metallic or ceramic. For example, when forming a component 13 of ceramic powder or silicon powder, the plasticizing process in the process chamber is the same as forming component 13 of metallic powders, except that the precompensation for dimensional and shape distortion must be adjusted for the particular material used. After completion of the component 13 using a powder-binder mixture, where the powder is a ceramic or silicon material the component is vitrified. Vitrification temperatures of, for example, about 900° C., produce the component 13 as a ceramic or silicon object.

Alternatively, instead of depositing a molten material, or a powderbinder mixture, a loose powder, without binder, may be deposited directly and in layers. The process according to this embodiment, however, a second powder is fed through a second nozzle, or second and third nozzles (not shown) alongside the desired layer to provide lateral support for the powder layers being built up. The final result is much like a foundry process in which the metallic or ceramic powder is embedded in a supporting body analogous to the molding sand used in foundry operations. The object is then sintered, protected and supported by the mold, until it is strong enough to be removed from the supporting second powder.

In a further embodiment, each layer of binder-free powder may be fused or strengthened by passing a heated roller over it before the deposition of the next powder layer.

Another alternate embodiment of the process discharges a metal powder having a high melting point together with a liquid material having a low melting point. The resulting heterogeneous mixture is subsequently alloyed in an oven.

A further modification of the process according to the invention is the use of homogeneous materials with a high melting point, especially in powder form. Prior to discharging these materials through the nozzle, they are melted. These materials are made molten in a process chamber. In this case the process chamber must be such that it allows such high temperatures to be reached (e.g. 1400° C. in the case of special steel).

The process according to the invention is both simple and user friendly. When independent means are available to produce and to apply pressure, it is possible to control termination of the discharge process precisely. When the molten or plasticized material in the pressure chamber is subjected to pressure, the discharge of the material from the nozzle begins simultaneously.

When the pressure is reduced, the material flow stops. If pressure is reduced further, until there is a vacuum in the process chamber, then termination of the discharge process occurs immediately. This is true even in the case of molten materials.

Using pressure control, these advantageous modifications of the process according to the present invention provide that no material remnants stay in the nozzle. Both molten materials and plasticized materials are produced, overcoming the longstanding problems in the prior art.

It is a particular advantage if the previously deposited layers of the component are temperature-controlled during the manufacturing process. If a liquid or plasticized material is deposited in layers, the layers, and particularly their surfaces, solidify very quickly. When the next layer of the material is deposited onto the already solidified or partially solidified layer, the surface of the partially solidified layer becomes molten due to heat absorbed from the hot material of the next layer. This potentially interferes with the accurate formation of the component. Temperature control, as provided in the present invention, ensures that the last-deposited layer is suitably hardened so that undesired melting or distortion is avoided.

A controlled heat gradient may be produced by any convenient means besides the liquid illustrated in FIGS. 3 and 4. For example, radiation convection heating, or by immersion in a temperature controlled liquid bath. This modification of the technique demonstrates a further advantage of the process. Since no oxide membranes are formed, strengthened bonds between the individual layers deposited on top of each other are ensured.

For a variety of applications it is advantageous to carry out the process in an atmosphere of an inert gas (for example nitrogen). To these ends, the entire container 11 of FIGS. 3 and 4 may be sealed in, or be part of, a suitable enclosure (not shown) into which the inert gas is introduced through a system of locks (not shown). Since sealed enclosures and gasfeeding locks are conventional, further discussion thereof is considered unnecessary.

According to an embodiment of the present invention, the process provides that the contours of the forming component are machined after the depositing of at least one layer. This makes it possible to achieve high measuring accuracies for each component.

The entire manufacturing process can be simplified if the manufacturing process is coupled to a numerically controlled milling machine. According to this embodiment, the present invention readily enables the manufacture of high-precision parts.

The apparatus for implementing the process includes a process chamber in which the material to be discharged is made molten, plasticized and placed under pressure. The process chamber is essentially a container which, by a resistance heater or induction heater, can be heated to the melting or plasticizing temperature of the material it contains. The heat capacity of the process chamber is selected so that the entire material contained in the chamber has a homogeneous structure after the melting or plasticizing process. The process chamber is provided with means for the generation of pressure. Advantageously, these means may be a piston that can be moved upward and downward into the pressure container.

However, pressure may also be produced by a gas fed into the process chamber. Pressure regulation by the pressure piston, or by adding or releasing gas, facilitates the accuracy of the process according to the present invention. In addition, it is advantageous when the entire process chamber can be transferred with the material it contains disposed therein. Alternate applications of the present invention, such as when working with different materials within a single series, are highly improved according to the gas fed process. No other pertinent art discloses such ready exchangeability as evidenced by the process chamber of the apparatus of the present invention. Thus, it can be seen how this measure leads to a simplification and acceleration of the process.

It is likewise advantageous when the base such as table 16 (FIG. 3), or non-movable base 17 (FIG. 4) on which the component is formed in layers can be tilted about its axis. Normally overlaps in portions of discharged material can only be achieved up to a certain angle in the absence of complicated support structures which must later be removed from the component. This is because during discharge from one nozzle, if the base is tilted during the manufacturing process in such a way that the component lies in the depositing plane (that the depositing plane lies vertical to the nozzle) no support structure is necessary for freely suspended parts, irrespective of their angle. The tilting of the base is, of course, controlled by the same control system controlling the translation of exchangeable nozzle 5 and the lowering of table 16 or the raising of exchangeable nozzle 5.

The base, on which the component material is deposited, must have suitable bonding characteristics. For example, the base may consist of plastic foam or teflon. Additionally, the base's design must be such (e.g. honeycomb configuration) that it can be easily removed from the completed component.

The following examples serve to demonstrate the process parameters of the process according to the present invention. These examples are not intended as limiting since numerous modifications and variations thereof will be apparent to those skilled in the art with the present disclosure for reference.

EXAMPLES

Case 1

A component was formed that had a thickness of about 0.5 mm and consisted of 41 layers. The pressure in the pressure chamber, i.e. the pressure at which the material was discharged through the nozzle, was 1.4 bar. The temperature in the pressure and plasticizing chamber was 105° C. The processing speed of the nozzle was 6.25 mm/sec. in the case of a circular nozzle with a diameter of 2 mm. The material was a powder-sinter mixture.

Case 2

A component was formed that had a thickness of about 0.4 mm and consisted of 41 layers. The pressure in the pressure chamber, i.e. the pressure at which the material was discharged through the nozzle, was 1.4 bar. The temperature in the pressure chamber was 103° C. The processing speed of the nozzle was 8.75 mm/sec. A circular nozzle with a diameter of 2 mm. was employed. The material was a powder-sinter mixture.

Case 3

A component was formed that had a thickness of about 0.5 mm and consisted of 41 layers. The pressure in the pressure chamber, i.e. the pressure at which the material was discharged through the nozzle, was 1.4 bar. The temperature in the pressure and plasticizing chamber was 102° C. The processing speed of the nozzle was 7.5 mm/sec. In this case, a circular nozzle with a diameter of 2 mm was used. The material was a powder-sinter mixture.

Case 4

A component was formed that had a thickness of about 0.4 mm and consisted of 49 layers. The pressure in the pressure chamber, i.e. the pressure at which the material was discharged through the nozzle, was 0.6 bar. The temperature in the pressure and plasticizing chamber was 85° C. The processing speed of the nozzle was 4.4 mm/sec. Employed in this case was a circular nozzle with a diameter of 1 mm. The material was Wood's alloy.

Case 5

A component was formed that had a thickness of 0.8 mm and consisted of 49 layers. The pressure in the pressure chamber, i.e. the pressure at which the material was discharged through the nozzle, was 0.7 bar. The temperature in the pressure and plasticizing chamber was 175° C. The processing speed of the nozzle was about 3 mm/sec. Employed in this case was a circular nozzle with a diameter of 1 mm. The material was MCP 150.

Figure 5:
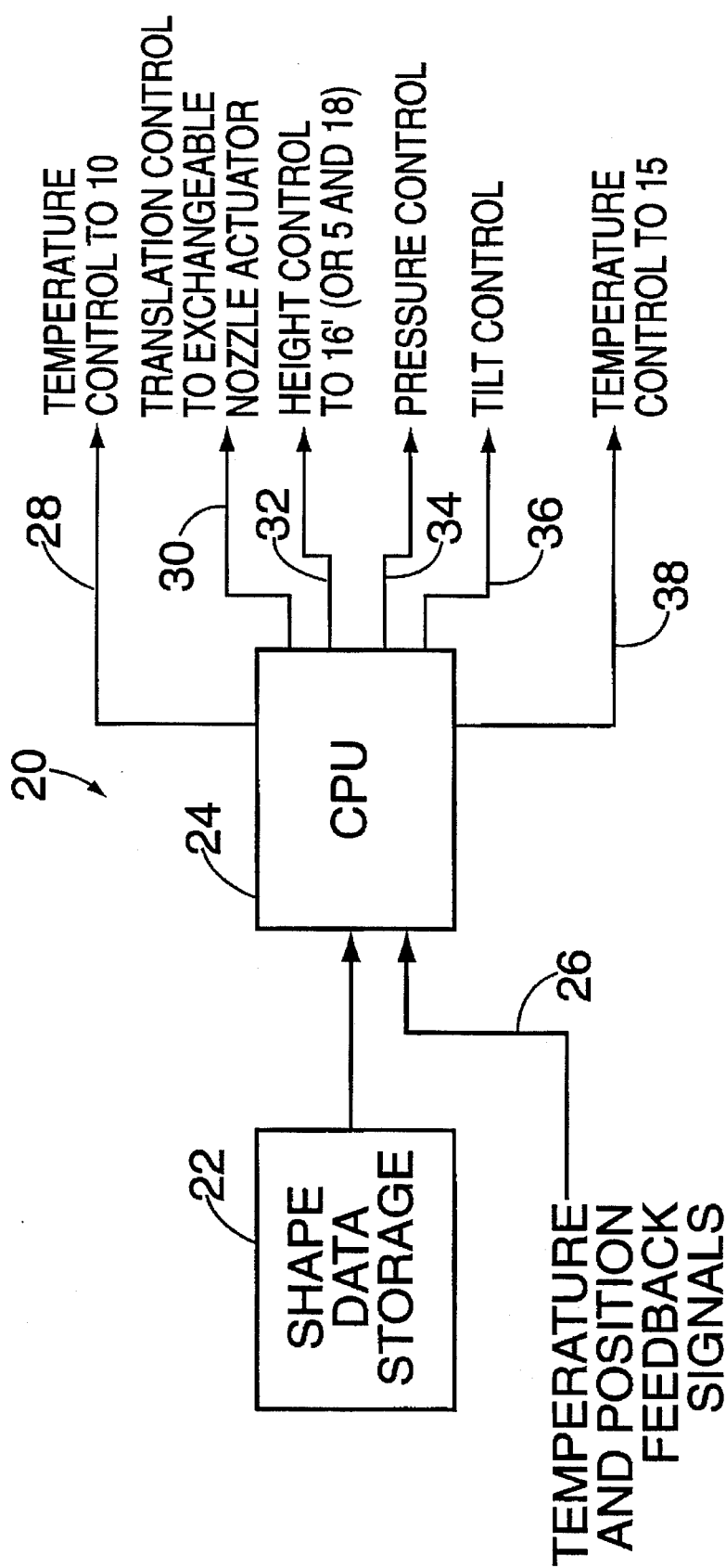
FIG. 5 is a simplified block diagram of a control system for the embodiments of the invention of FIGS. 1-4.

Referring now to FIG. 5, a control system 20 includes a data shape storage 22 contains the sequence of commands required to produce the desired three-dimensional object. Data shape storage 22 may be any convenient device such as, for example, magnetic tape, magnetic of optical disk. The sequence of commands from the data shape storage 22 is applied to a central processing unit 24. Central processing unit 24 receives feedback signals on a line 26 indicating the present temperatures and/or positions of elements in the embodiments of the invention. Central processing unit 24 calculates the required command signals to be sent to the actuators and temperature control elements according to its inputs. The identification of signal type and its destination is shown adjacent each of output lines 28, 30, 32, 34, 36 and 38. These signal are applied to conventional actuators and regulators to perform the functions described in connection with the embodiments of FIGS. 1–4. Since the actuators and temperature regulators are conventional, further description of the destinations of these signals is not considered necessary. For purposes of completeness, however, actuators for height, displacement and tilt may be stepper motors, and temperature feedback signals may be generated by thermocouples, or the like.

Having described preferred embodiments of the invention with reference to the accompanying figure, it is to be understood that the invention is not limited to those precise embodiments, and that various changes and modifications may be effected therein by one skilled in the art without departing from the scope or spirit of the invention as defined in the appended claims.

What is claimed is:

1. Apparatus for the free-forming manufacture of three-dimensional components, comprising:
    a process chamber having first and second ends;
    a nozzle at a first end of said process chamber;
    said nozzle being adapted for the discharge of at least one of a molten material and a powdered material therethrough;
    means for generating a temperature inside said process chamber at which a starting material is plasticize;
    means for producing a pressure sufficient to discharge said plasticize or molten material through said nozzle;
    means for programming said nozzle to discharge said plasticize or molten material for deposit; and
    means for receiving said plasticize or molten material.

2. Apparatus for the free-forming manufacture of three-dimensional components of a predetermined shape, according to claim 1, wherein said process chamber is cylindrical in shape.

3. Apparatus for the free-forming manufacture of three-dimensional components of a predetermined shape, according to claim 2, wherein said means for producing pressure is a moveable pressure piston.

4. Apparatus for the free-forming manufacture of three-dimensional components of a predetermined shape, according to claim 3, wherein said means for receiving is a non-movable base.

5. Apparatus for the free-forming manufacture of three-dimensional components of a predetermined shape, according to claim 3, wherein said means for receiving is a base having devices for tilting said component being manufactured into the plane of material discharge.

6. Apparatus for the free-forming manufacture of three-dimensional components of a predetermined shape, comprising:
    a process chamber having first and second ends;
    a nozzle, arranged at a first end of said process chamber, through which a plasticized or molten material is discharged; means for generating a temperature inside said process chamber at which a starting material is plasticized or made molten;
    means for producing a pressure sufficient to discharge said plasticized or molten material through said nozzle;
    means for programming said nozzle to discharge said plasticized or molten material for deposit; and
    means for receiving said plasticized or molten material;
    wherein said means for producing pressure is gas fed into said process chamber.

7. Apparatus for the free-forming manufacture of three-dimensional components of a predetermined shape, according to claim 6, wherein said process chamber is cylindrical in shape.

8. Apparatus for the free-forming manufacture of three-dimensional components of a predetermined shape, according to claim 7, wherein said means for receiving is a non-movable base.

9. Apparatus for the free-forming manufacture of three-dimensional components of a predetermined shape, according to claim 7, wherein said means for receiving is a base having devices for tilting said component being manufactured into the plane of material discharge.

10. Process for the free-forming manufacture of three-dimensional components, comprising:
    producing one of an unmixed powder and a powder-binder mixture from a powder material with a high melting point and a binder;
    filling said mixture into a process chamber having an exchangeable nozzle disposed at an end thereof;
    melting said mixture in said process chamber by raising the temperature to produce a plasticize material;
    applying pressure to said plasticize material;
    depositing said plasticize material through said nozzle onto a base; and
    completing the discharge process by reducing pressure in said process chamber, whereby said processing direction and processing speed of said nozzle are programmed during the entire process.

11. Process for the free-forming manufacture of three-dimensional components according to claim 10, wherein:
    said plasticized material is discharged in individual layers; and
    a homogeneous bond occurs between said individual layers of discharged material.

12. Process for the free-forming manufacture of three-dimensional components according to claim 11, wherein:
    the plasticizing temperature in the process chamber is the same as the melting temperature of the binder.

13. Process for the free-forming manufacture of three-dimensional components according to claim 12, wherein:
    the component formed from the discharged powder-binder mixture is subsequently subjected to a heat treatment, during which the binder is expelled.

14. Process for the free-forming manufacture of three-dimensional components according to claim 13, wherein:
    accumulations of remnant material after depositing of at least one layer are eliminated by means for machining, during the process of manufacturing said component.

15. Process for the free-forming manufacture of three-dimensional components according to claim 14, wherein:
    the discharge process takes place in an oxidation-free atmosphere.

16. Process for the free-forming manufacture of three-dimensional components according to claim 15, wherein:
    the temperature regulation of the already deposited layers of a component being manufactured is accomplished by a temperature-regulated liquid bath, whereby the liquid level is adapted to the continuing discharge process.

17. Process for the free-forming manufacture of three-dimensional components according to claim 16, wherein:
    the temperature regulation of said already deposited layers of a component being manufactured is accomplished by a gas flow.

18. Process for the free-forming manufacture of three-dimensional components, using the apparatus of claim 9, comprising:
    producing a powder-binder mixture from a powder material with a high melting point and a binder;

filling said mixture into the process chamber; melting said mixture in the process chamber by raising the temperature to produce a plasticized material;

applying pressure to said plasticized material; depositing said plasticized material through the nozzle; and completing the discharge process by reducing pressure in said process chamber, whereby the processing direction and processing speed of the nozzle are programmed during the entire process.

19. Process for the free-forming manufacture of three-dimensional components according to claim 18, wherein:

said plasticized material is discharged in layers; and a homogeneous bond occurs between the individual layers of the discharged material.

20. A process for the free-forming manufacture of three-dimensional components, by the layered discharge of a material through a programmed nozzle onto a base, comprising:

adding a powdered material to a process chamber;

applying pressure to said powder material;

depositing said plasticize material in layers through a nozzle arranged at one end of said process chamber, whereby the material is discharged by pressure building up in the process chamber; and completing the discharge process by reducing pressure in the process chamber, whereby the processing direction and processing speed of the nozzle is programmed during the entire process.

21. A product, produced by the process of claim 20, wherein said powder is one selected from the group consisting of different powders.

22. A product, produced by the process of claim 20, wherein said each layer of said powder is heat rolled prior to deposition of the next powder layer.

23. A product, produced by the process of claim 20, wherein said power is embedded in a supporting body, and sintered.

* * * * *